United States Patent [19]

Hansen et al.

[11] Patent Number: 5,453,243

[45] Date of Patent: Sep. 26, 1995

[54] METHOD FOR PRODUCING TITANIUM ALUMINIDE WELD ROD

[75] Inventors: Jeffrey S. Hansen, Corvallis; Paul C. Turner; Edward R. Argetsinger, both of Albany, all of Oreg.

[73] Assignee: The United States of America as represented by the Secretary of the Interior, Washington, D.C.

[21] Appl. No.: 291,793

[22] Filed: Aug. 17, 1994

[51] Int. Cl.$^6$ ............................... B22F 7/00; B22F 7/04
[52] U.S. Cl. ............................... 419/45; 419/25; 419/38; 419/43; 419/46; 419/56
[58] Field of Search ............................... 419/25, 38, 43, 419/45, 46, 56

[56] References Cited

U.S. PATENT DOCUMENTS

| | | | |
|---|---|---|---|
| 4,909,842 | 3/1990 | Dunmead et al. | 75/236 |
| 4,915,903 | 4/1990 | Brupbacher et al. | 420/129 |
| 4,985,202 | 1/1991 | Moshier et al. | 420/590 |
| 5,198,188 | 3/1993 | Holt et al. | 419/45 |
| 5,256,368 | 10/1993 | Oden et al. | 419/10 |
| 5,342,572 | 8/1994 | Stangle et al. | 419/45 |

*Primary Examiner*—Peter A. Nelson
*Assistant Examiner*—Scott T. Bluni

[57] ABSTRACT

A process for producing titanium aluminide weld rod comprising: attaching one end of a metal tube to a vacuum line; placing a means between said vacuum line and a junction of the metal tube to prevent powder from entering the vacuum line; inducing a vacuum within the tube; placing a mixture of titanium and aluminum powder in the tube and employing means to impact the powder in the tube to a filled tube; heating the tube in the vacuum at a temperature sufficient to initiate a high-temperature synthesis (SHS) reaction between the titanium and aluminum; and lowering the temperature to ambient temperature to obtain a intermetallic titanium aluminide alloy weld rod.

8 Claims, No Drawings

METHOD FOR PRODUCING TITANIUM ALUMINIDE WELD ROD

BACKGROUND OF THE INVENTION

1. Field of the Invention

The present invention relates to a sustained high-temperature synthesis (SHS) reaction process for making titanium aluminide welding rod or wire. In particular, the invention pertains to a process for producing a titanium aluminide weld rod by utilizing thin-wall metallic tubes to contain and confine the SHS reaction between a powdered mixture of titanium and aluminum, and in which the thin-wall tube may or may not become part of the weld rod alloy. After the thin-wall tube is packed with the titanium and aluminum powder, the tube may be rolled on a rolling mill, subjected to a vacuum, and heat treated in vacuum at about 700° C. to initiate the sustained high temperature synthesis (SHS) reaction between the titanium and aluminum. Upon cooling of the thin-wall metallic tube, a finished weld rod is obtained.

2. Background of the Invention

It is known that intermetallic materials can promote higher fuel efficiencies in internal combustion engines and reduce environmental pollutants in off gases by allowing increased engine operating temperatures. One intermetallic material, titanium aluminide, has outstanding hot strength properties, thereby making it desirable as a material for jet and turbine engine hot section components. However, the cost of titanium aluminide is higher than most conventional materials, not only because the elemental costs are higher but because titanium aluminide has poor toughness at room temperature and extra precautions must be taken during processing to prevent fracture and breakage.

Manufacturers are testing titanium aluminide alloys for the next generation of aircraft engines, and most components are expected to be made by investment casting, since titanium aluminide cannot be easily forged or otherwise worked. Also, casting temperatures for titanium aluminide alloys are critical, and caution must be used to relieve stresses before cooling through about 700° C. Nevertheless, even when proper cooling is done, cracking and defects in a significant number of parts occurs. To and repair slightly damaged parts that may contain surface cracks, inclusions, or other imperfections, the defects are removed by grinding away the defective material and replacing it with new material via welding. Welding rod of the same material is required to accomplish the weld repair.

Titanium aluminides have low room temperature ductility, and for this reason, it is difficult to fabricate small diameter (0.078") weld rod. Presently, titanium aluminide weld rod is made by explosive forming, and the cost is about $1,000.00/lb. At this high price, there is incentive to find less expensive means for producing titanium aluminide weld rod, since a less expensive rod will lower the cost of weld repairing, increase the number of parts worth repairing, and lower the overall cost of producing titanium aluminide components. As the cost goes down, more applications for titanium-aluminide will be found.

Titanium aluminide is extremely brittle at room temperature, and small diameter welding wire of this alloy is prone to breakage under normal handling. Also, because of this brittleness, titanium aluminide is not easily produced from bars or ingots to obtain small rod and wire diameters. A need exists to provide processes for reducing the cost of titanium aluminide welding rods, reducing the cost of repairing titanium aluminide castings, and reducing the cost of producing fabrications.

Titanium aluminide is a relatively new alloy and has not been produced in large quantities; however, it is expected that within about five years, most jet engines will be utilizing this alloy to a significant extent. To achieve high production efficiencies, a means of joining fabricated sections together is necessary. However, welding is made difficult because titanium aluminide is an intermetallic alloy characterized by little room temperature ductility and toughness. This lack of ductility prevents use of this alloy in many conventional fabrication processes, such as bar forging or swaging, and wire drawing. It has been found that, when small diameter bars of this alloy are heated to increase ductility prior to size reduction, rapid surface cooling usually occurs and cracking follows.

Although small diameter (0.078") titanium aluminide welding wire is made by explosive forming in a series of several steps, the process is time consuming and expensive. Therefore, a need exists to provide a less time consuming and less expensive process for providing titanium aluminide weld rod.

SUMMARY OF THE INVENTION

One object of the invention is to provide a process for producing intermetallic titanium aluminide alloy weld rod using powder metallurgy.

A further object of the invention is to produce intermetallic titanium aluminide alloy weld rod utilizing a sustained high-temperature synthesis (SHS) reaction to manufacture the weld rod.

A yet further object of the invention is to provide a process for producing intermetallic titanium aluminide alloy weld rod in which thin-wall metallic tubes are used to contain and confine the sustained high-temperature synthesis (SHS) reaction, and in which the thin-wall tube may or may not become part of the weld rod alloy.

In general, the invention process is accomplished by attaching a niobium tube to a vacuum line at one end; placing means over the vacuum line at a junction between the vacuum line and niobium tube to prevent powder from entering the vacuum system, pulling a vacuum in the tube; placing a mixture of titanium and aluminum powder in the tube, and packing the mixture; heat treating the tube in vacuum at a temperature of about 700° C. for a sufficient period of time to initiate high-temperature synthesis (SHS) reaction between the titanium and aluminum; and permitting the temperature to fall to room temperature to obtain a titanium aluminide alloy weld rod.

DETAILED DESCRIPTION OF THE INVENTION

Example 1

One end of a 0.088 inch ID niobium tube of 0.0025 inches wall thickness was attached to a vacuum line.

A piece of rag was drawn over the vacuum line at the junction of the vacuum to the niobium tube to prevent powder from entering the vacuum system. A vacuum of about 25 inches was pumped on the tube. A 50/50 mixture of titanium and aluminum powder was funneled into the open end of the tube while a small vibrator was moved up and down the tube length. At several intervals during the process, a rod was inserted into the tube for the purpose of tamping and packing the powder.

The tube was weighed before and after the powder addition to determine the packing density and the percentage of the niobium. The niobium constituted 13.9% of the total weight of the filled tube.

After filling, the tube was rolled in one pass in a small rolling mill that was machined with circumferential grooves measuring 0.075" diameter. The length of the filled tube increased from about 36 inches to 38 inches after rolling. The rolling produced a slight flange on the tube but no breaks.

The tube was heat treated in vacuum @700° C. A sustained high-temperature synthesis (SHS) reaction occurred between the titanium and aluminum, but the niobium was not affected, and remained metallic looking.

After cooling to ambient temperature, the finished weld rod was used to simulate a repair weld on a section of a titanium aluminide casting. Preheating and postheating of the casting to 800° C., followed by furnace cooling were utilized to prevent cracking from thermal shock. Welding was no different than tungsten inert gas (TIG) and metal inert gas (MIG) welding of other metals. The welds showed no cracks, and the weld grain size was somewhat larger than the grain size of the casting.

It was subsequently found that the step of rolling (to further pack the powders within the tube), was not absolutely essential and that welds of comparable quality are produced when the rolling step was eliminated from the manufacturing process.

ALTERNATE EMBODIMENTS OF THE INVENTION

Several variations of the process were tested as alternative processing means, or as an effort to eliminate processing steps and reduce the niobium content of the alloy.

The method of loading and consolidating the powder in the tubes was the same as described in the Example 1 embodiment. The variations were as follows:

A) Cold pressing the powders in the niobium tube without heating. No titanium-aluminum SHS reaction occurred.

B) Cold pressing the powders in the niobium tube, with heating to 700° C. for 15 minutes to initiate the SHS titanium-aluminum reaction, followed by air cooling, and flaking off of NbO.

C) Cold pressing the powders in the niobium tube, with heating to 700° C. for 15 minutes in vacuum to initiate the SHS titanium-aluminum reaction, and furnace cooling in a vacuum.

Tubes which were heated in vacuum did not oxidize, and the niobium tube remained intact and shiny. Test welds were made with tubes A, B, and C on a 1.5" diameter piece of titanium aluminide heated to 850° C. The welds were made in shallow ⅜" diameter holes that were drilled into the titanium aluminide to simulate casting defects that had been gouged out. After welding, the piece was immediately put in a furnace and furnace cooled to room temperature. The welds and heat-affected zones (HAZ) showed no external cracking.

The following welding characteristics were noted:

Sample A—Splattering and sparkles. Tube flamed after weld completed.

Sample B—Best, performed well, no splatter.

Sample C—Second best, very little splatter.

Metallography of weld cross sections showed the following:

Sample A—(cold pressed tube). The weld contained 14+ pits, one of which was fairly large; however, overall the structure was fine grained.

Sample B—(cold pressed and furnaced—tube removed). No pits. Fine grained in general. Larger elongated grains toward heat affected zone (HAZ). More dendritic than A. One crack to HAZ.

Sample C—(cold pressed and vacuum furnaced) 7+ pits, one large, two cracks. Very large grained and dendritic.

Cracking is believed due to inexperience with pre and post heat treatment. Weld C which contained the most niobium also had very large grains. Although weld A was produced from a rod containing the maximum niobium, it appears that a large portion of the niobium spattered off. The best weld in terms of microstructure and ease of welding was weld B. Less niobium appears to produce finer grains and less pitting. However, the niobium tube adds rigidity to the rod and prevents it from breaking, and in this respect, niobium is necessary.

Attempts were also made to produce weld rods by consolidating titanium and aluminum powders in plastic and glass tubes prior to initiating the SHS reaction. Powders were loaded and consolidated in the plastic and glass tubes as described in the method of Example 1.

Plastic tubes were cold pressed at 60,000 psi to densify the powders. The plastic was cut off to expose the densified powder. Numerous radial cracks had developed during the cold pressing, and the largest length of rod measured not more than ¼ in. long. Additional plastic tubes containing the mixed powders were put in a furnace at 650° C. after cold pressing to initiate the SHS reaction and burn off the plastic tube. The plastic burned off almost immediately, and the unconfined SHS reaction spewed powder particulates throughout the furnace.

Experiments with the glass rods also failed. Powders were packed in quartz glass tubes using the method described in Example 1. Cold pressing was not performed in order to keep the glass intact. The tubes containing the titanium and aluminum powders were transferred directly to a furnace at 800° C. The SHS reaction occurred without breaking the glass. The tube remained intact as it was furnace cooled to room temperature. The only apparent means to separate the densified powder from the glass was to break the glass. In breaking the glass, the rod, if it was not fractured beforehand, also broke.

Tests employing titanium and aluminum powders in titanium tubes were not tried, due to an inability to locate thin-wall titanium tubing. However, this combination may be ideal. The ratio of titanium to aluminum in the powder mixture could be adjusted to reflect the powder packing density and tubing thickness to achieve an optimum weld rod composition.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalence of the disclosed embodiments. It is to be understood that the phraseology or terminology employed herein is for the purpose of description and not of limitation.

What is claimed is:

1. A process for producing titanium aluminide weld rod comprising:

attaching one end of a metal tube to a vacuum line; placing a means between said vacuum line and a junction of the tube to prevent powder from entering the vacuum line;

inducing a vacuum within the tube; placing a mixture of titanium and aluminum powder in the tube and employing means to impact said powder in the tube to a filled tube; heating the tube in the vacuum at a temperature sufficient to initiate a high-temperature synthesis (SHS) reaction between the titanium and aluminum such that said metal tube becomes part of the weld rod; and lowering the temperature to ambient temperature to obtain an intermetallic titanium aluminide alloy weld rod.

2. The process of claim 1, wherein the vacuum is about 25 inches and the mixture of titanium aluminum powder is present in an amount of about 50/50 percent by volume.

3. The process of claim 2, wherein the metal tube is niobium.

4. The process of claim 3, wherein the niobium is about 13.9 percent by weight of the total weight of the filled tube.

5. The process of claim 1, wherein subsequent to filling said metal tube with a mixture of titanium and aluminum powder, said metal tube is passed through a rolling mill to ensure packing of the powders within the tube.

6. The process of claim 4, wherein the temperature sufficient to initiate said high-temperature synthesis reaction is about 700° C.

7. The process of claim 4, wherein heating is at a temperature of about 700° C. for a period of about 15 minutes, wherein lowering the temperature to ambient temperature is by air cooling, and wherein NbO is flaked off of said tube.

8. The process of claim 6, wherein lowering the temperature to ambient temperatures is affected by furnace cooling of said tube in a vacuum to prevent oxidation of the tube, and maintain the niobium tube intact.

* * * * *